United States Patent [19]

Dunning et al.

[11] Patent Number: 5,394,812
[45] Date of Patent: Mar. 7, 1995

[54] INJECTOR FOR POLYMER PLACEMENT AND A METHOD THEREFORE

[76] Inventors: Levant G. Dunning; Ardith A. Dunning, both of 8621 Coolwoods Way; K. C. Doyle Forbes, 7622 Lakewood Park Dr., all of Sacramento, Calif. 95828

[21] Appl. No.: 871,353

[22] Filed: Apr. 20, 1992

[51] Int. Cl.⁶ ............................................. A01C 23/00
[52] U.S. Cl. .................... 111/127; 222/461; 222/529; 222/536; 111/7.1
[58] Field of Search ............... 111/127, 7.1; 222/461, 222/529, 536; 366/34; 166/275

[56] References Cited

U.S. PATENT DOCUMENTS

| | | | |
|---|---|---|---|
| 1,723,955 | 8/1929 | Shepherd et al. | 111/7.1 X |
| 2,930,334 | 3/1960 | Marron et al. | 111/6 |
| 3,012,526 | 12/1961 | Baldwin et al. | 111/6 |
| 3,474,746 | 10/1969 | Hiniker | 222/461 |
| 3,521,819 | 7/1970 | Johnston | 239/99 |
| 3,815,525 | 6/1974 | Kainson et al. | 111/6 |
| 3,875,876 | 4/1975 | Pustovoit et al. | 111/1 |
| 3,902,558 | 9/1975 | Watson, Jr. | 166/275 X |
| 4,009,666 | 3/1977 | Russell et al. | 111/6 |
| 4,033,745 | 7/1977 | Moore | 71/28 |
| 4,145,207 | 3/1979 | Moore | 71/29 |
| 4,163,657 | 8/1979 | Koslow et al. | 71/27 |
| 4,164,413 | 8/1979 | Jinno et al. | 71/103 |
| 4,298,512 | 11/1981 | Sartoretto et al. | 71/28 |
| 4,300,461 | 11/1981 | Hodge et al. | 111/7.1 X |
| 4,332,610 | 6/1982 | Sartoretto et al. | 71/28 |
| 4,380,886 | 4/1983 | Koslow et al. | 47/58 |
| 4,409,015 | 10/1983 | Grace, Jr. | 71/28 |
| 4,448,690 | 5/1984 | Maphis | 405/128 X |
| 4,526,606 | 7/1985 | Formaini | 504/101 |
| 4,578,105 | 3/1986 | Moore | 71/28 |
| 4,763,836 | 8/1988 | Lyle et al. | 239/69 |
| 4,807,544 | 2/1989 | Cross et al. | 111/127 |
| 4,838,701 | 6/1989 | Smith et al. | 366/34 X |
| 4,907,516 | 3/1990 | Rogers | 111/127 |
| 4,927,447 | 5/1990 | Youssef et al. | 71/27 |
| 5,013,349 | 5/1991 | Tanaka | 71/27 |

*Primary Examiner*—Randolph A. Reese
*Assistant Examiner*—Christopher J. Novosad
*Attorney, Agent, or Firm*—Bernhard Kreten

[57] ABSTRACT

A method and apparatus for dispensing a substance such as a hydrophylic polymer into a soil to minimize the need for repeated irrigation, plant feeding or the like. A trailer supports a mixing tank within which the polymer and a liquid such as water are continuously agitated. The mixture, in a liquid form, is sent through a pump to an outlet having a plurality of apertures communicating with the tank via a manifold. A valve operatively conditions the throughput of the water and polymer so that a series of high pressure pulses exit the outlet and cause slugs of liquid to contact the ground at a sufficient velocity that the slugs penetrate the soil and deform under the surface of the soil. The rapid opening and closing of the valve when used with the outlet's apertures can provide a distribution pattern in the soil which is substantially uniform and minimizes the likelihood of disproportionate polymer infusion in the ground which would otherwise cause non-uniformly swelling.

24 Claims, 9 Drawing Sheets

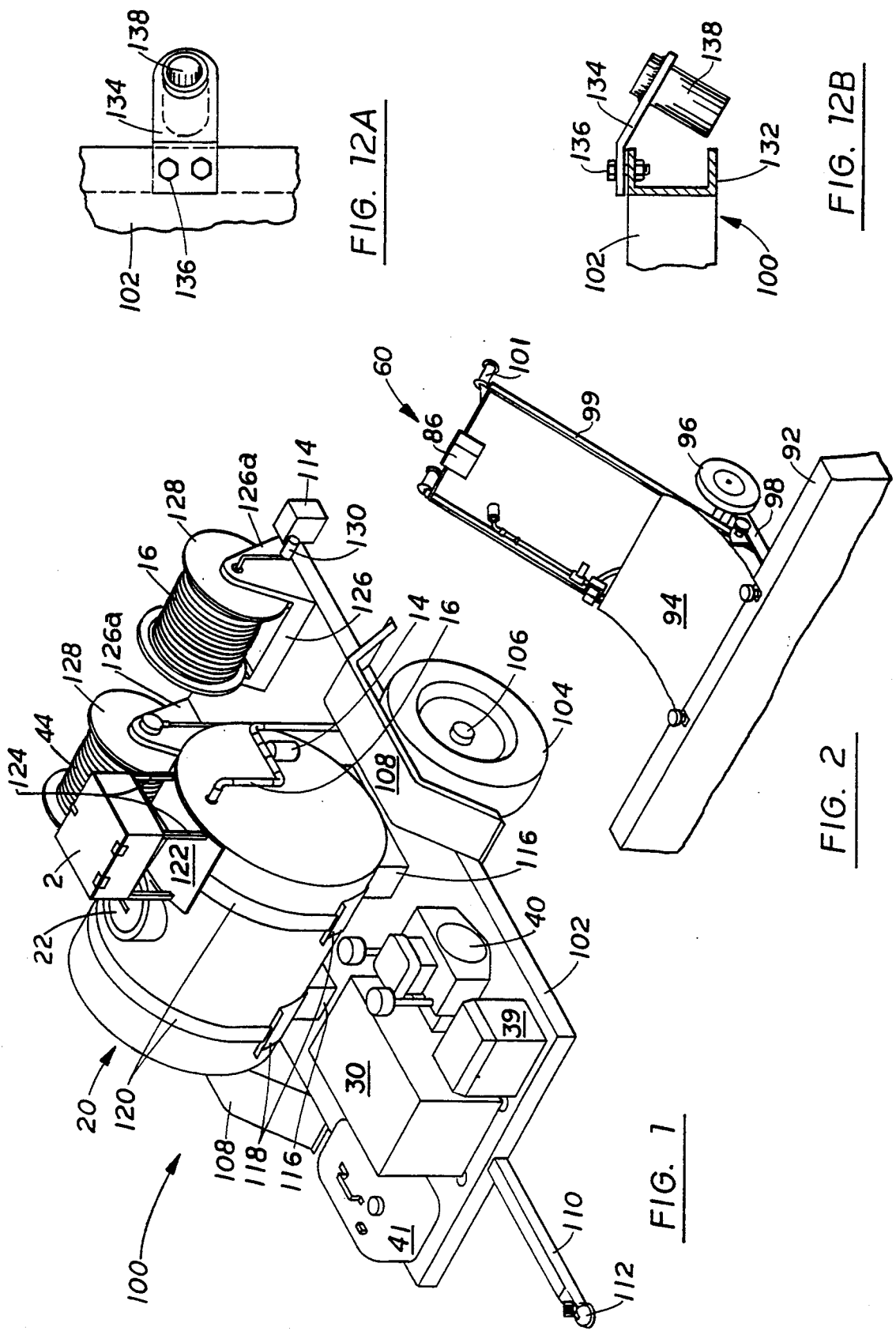

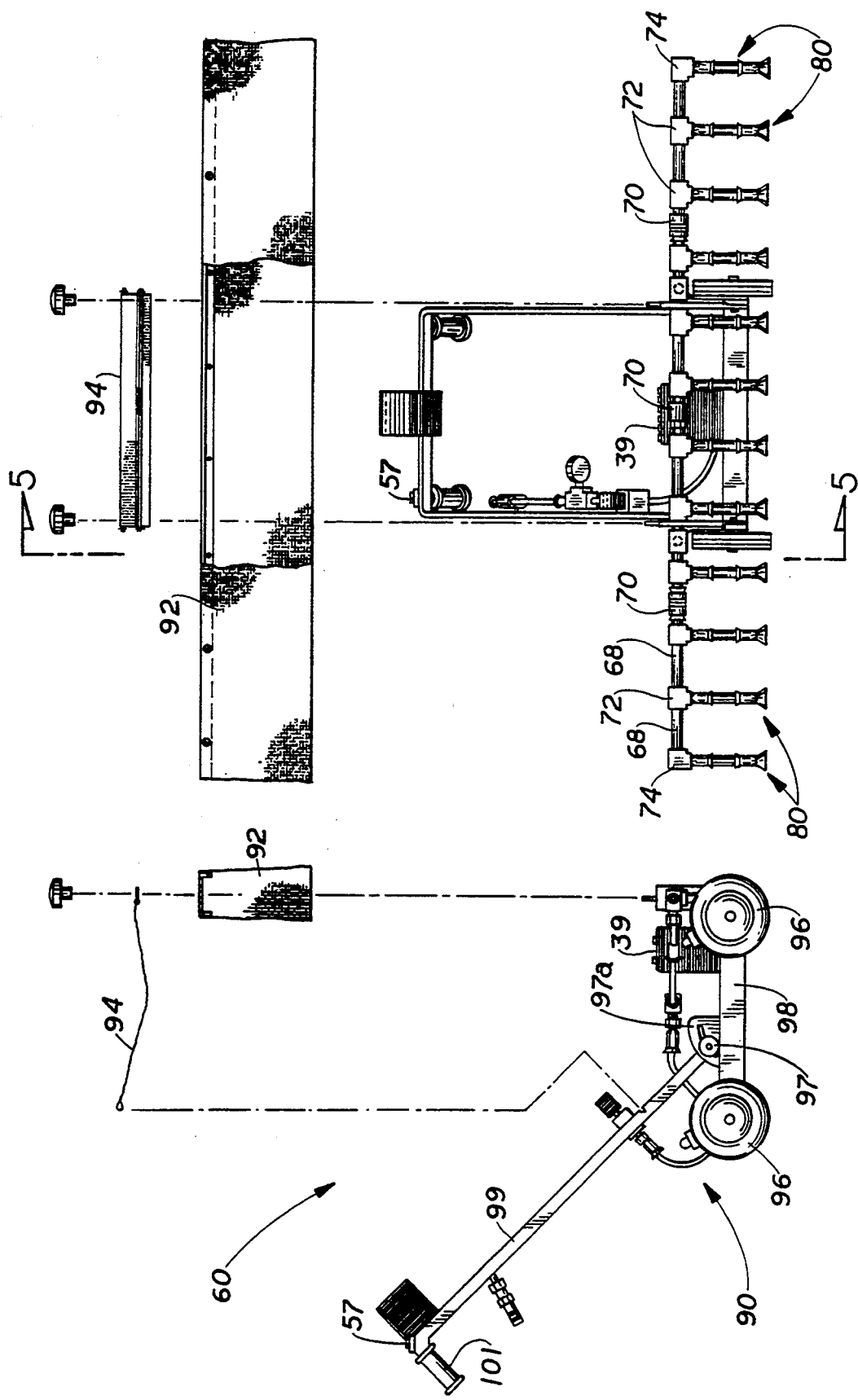

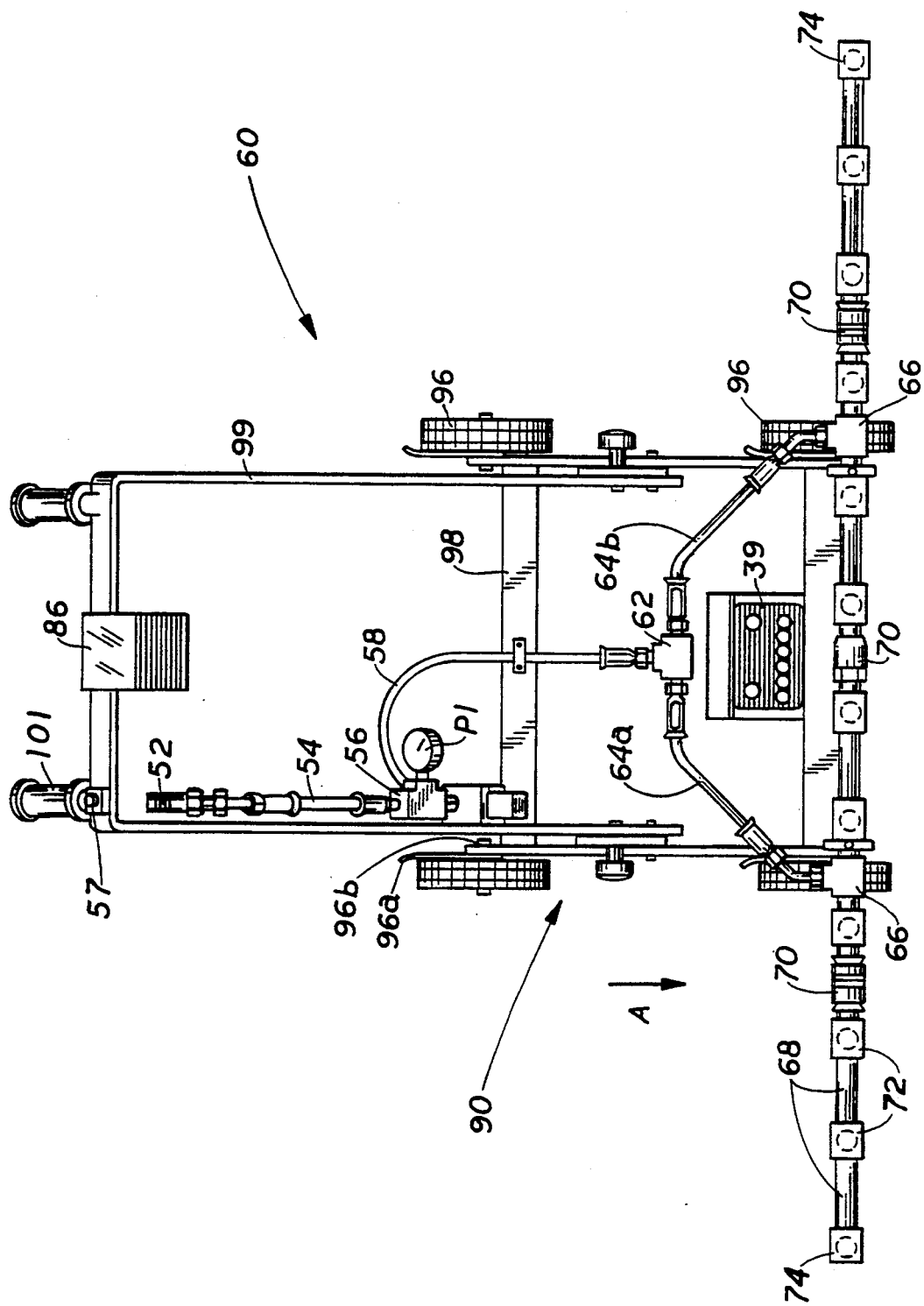

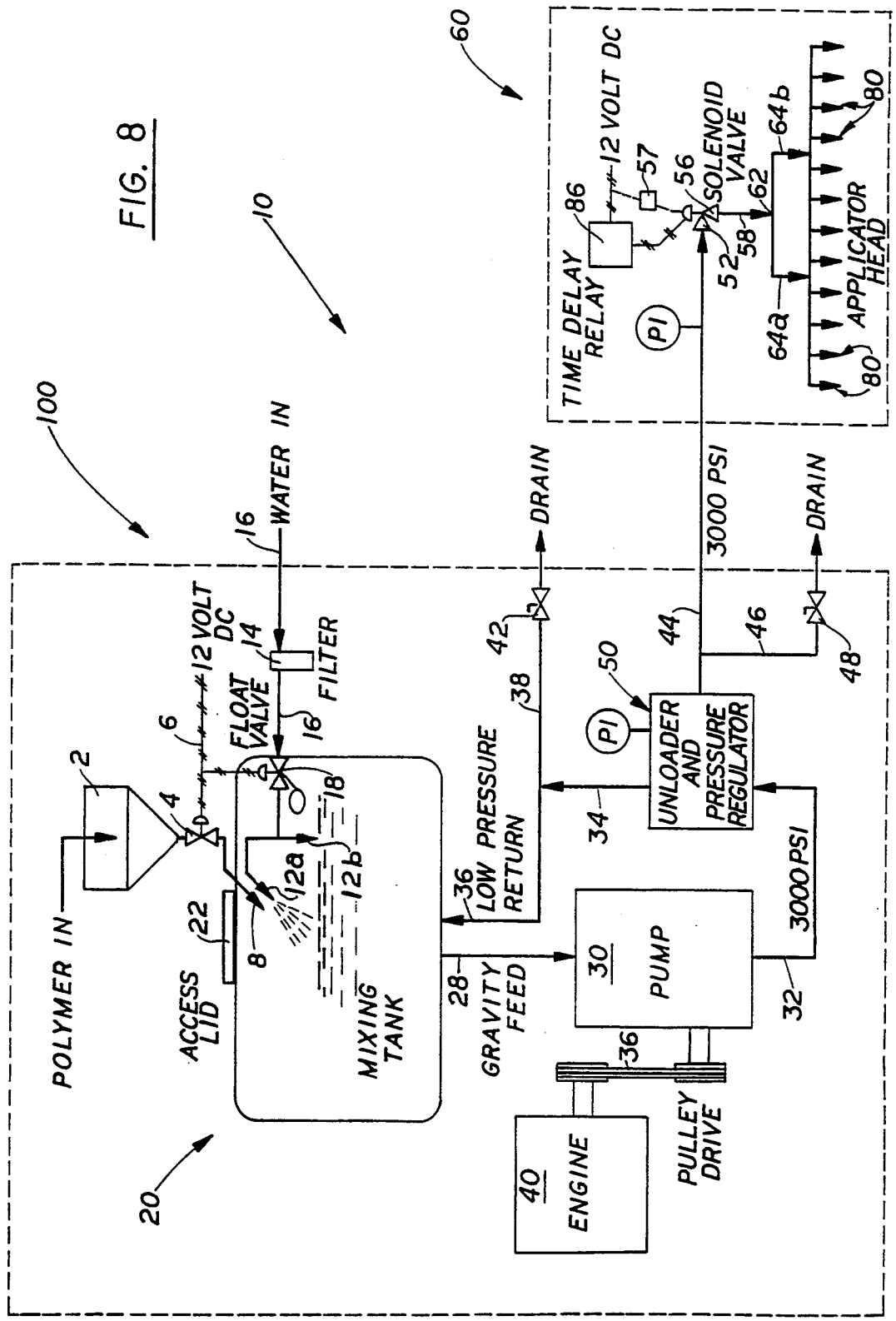

INJECTOR FOR POLYMER PLACEMENT AND A METHOD THEREFORE

FIELD OF THE INVENTION

The following invention relates generally to an improved method and apparatus for high-pressure liquid injection of substances into soil. More particularly, the invention relates to an apparatus for delivering a hydrophylic polymer mixture (or other agricultural substances) and a method for injecting these substances into the soil to be treated such that the need for subsequent irrigation (or other agricultural maintenance) is decreased and plant growth is optimized.

An apparatus and method is disclosed for injecting a small quantum of gel-like substances of hydrophylic material into the ground as discrete cylindrical hydrophylic slugs deployed in a uniform pattern. Upon penetration of the soil, and especially when the slug of material reaches a soil change or gradient, the hydrophylic material stops its advancement into the soil substrate and either fans out or remains in its initial configuration. Water which contacts the hydrophylic material, as when irrigation is subsequently administered, causes the hydrophylic material to swell and hold the water for protracted periods of time.

BACKGROUND OF THE INVENTION

When arid regions are to be used for agricultural use or plant husbandry, or are to be cultivated in some manner, such as when planting sod for a golf course, the viability of such a project is contingent upon the delicate balance that must be struck between the harvest and/or the fees which can be charged for the agricultural operation coupled with the expenses required to maintain the area in a non-arid state.

Even in non-arid regions, periodic droughts can cause a growing enterprise to be curbed because of a temporary unavailability of water. Moreover, an increased cost in making water available can make projects which were once feasible no longer feasible.

Polymers are known to exist, which, when mixed in soil or other growing media can extend the time between watering. One such known polymer is formed as a cross-linked potassium polyacrylate/polyacrylamide copolymer marketed by Stockhousen in Greensboro, N.C. under the name STOCKOSORB®. Apparently, the polymer acts as a hydrophylic trap and retains the moisture in a strategic location immediately adjacent the root zone of the plants to be grown and keeps the water at that level for subsequent incremental extraction by the plant as needed. In many watering operations involving soil having the less than optimal friability, a majority of the water is lost by run off or migration away from the root zone of the crops or plants to be grown. Thus, in order for polymers to exhibit the maximum effectiveness, it is essential that they be uniformly placed at an appropriate distance with respect to the root zone of the plants being grown.

One known technique for dispensing the polymer involves mixing the polymer with water in an injection pump which directly receives the polymer. Water is then pumped therein at high pressure. Please see FIG. 13. Mixing polymer in this manner stresses the equipment because the polymer may clump up when mixed in this fashion, especially when dispensing is to be throttled on and off.

It is also known in the prior art to provide an apparatus which attempts to administer the polymer in a liquid solution as a uniform continuous stream into the ground. The problem with attempting to provide such a stream of material in a liquid form and causing it to enter into the ground is that such high pressure is involved that the mechanical appliances associated with the distribution of the liquid and polymer make the system unreliable and prone to failure because it cannot simultaneously and continuously achieve the force required to accurately penetrate the soil in a small, safe to use machine.

In the past, it is known to treat sod on golf courses with this polymer by slicing into the sod using a disc-like implement or injecting a liquid ribbon. When placing the polymer in a furrow by the disc, one then must roll down the soil atop the thus placed polymer. One problem with either technique involves the spacing between adjacent discs or ribbons. This provides a limitation controlling the distance between rows of polymer. The effect of providing a linear ribbon of polymer is that the sod manipulated in this way swells in a non-uniform manner in the presence of moisture. The result is to form "washer-board" undulations on the surface of the golf course because of the tendency of the polymer to swell. This provides non-uniform expansion between the polymer treated area versus the non-polymerized portions of the sod when irrigating. This varied surface has no place on a facility such as a golf course where washer board undulations are an anathema to the game of golf.

Other machinery to facilitate the injection of fluids, as well as methods for such injection have been provided. However, none of the prior art devices contemplate the desirability of using a machine in combination with an additive in a liquid which decreases the need for subsequent irrigation. The focal point of the prior art devices has been to provide conditioning to soil which facilitates the growth of plants, rather than reducing the need for subsequent irrigation. It should be noted however that the present invention is not limited to only injecting a polymer mixture, and as configured is capable of injecting other substances, such as fertilizers, pesticides and herbicides into the soil as needed.

The following prior art reflects the state of the art of which applicant is aware and is included herewith to discharge applicants' acknowledged duty to disclose relevant prior art. It is stipulated, however, that none of these references teach singly nor render obvious when considered in any conceivable combination the nexus of the instant invention as disclosed in greater detail hereinafter and as particularly claimed.

| INVENTOR | PATENT NO. | ISSUE DATE |
| --- | --- | --- |
| Marron, et al. | 2,930,334 | March 29, 1960 |
| Baldwin, et al. | 3,012,526 | December 12, 1961 |
| Johnston | 3,521,819 | July 28, 1970 |
| Kainson, et al. | 3,815,525 | June 11, 1974 |
| Pustovoit, et al. | 3,875,876 | April 8, 1975 |
| Russell, et al. | 4,009,666 | March 1, 1977 |
| Koslow, et al. | 4,163,657 | August 7, 1979 |
| Jinno, et al. | 4,164,413 | August 14, 1979 |
| Koslow, et al. | 4,380,886 | April 26, 1983 |
| Youssef, et al. | 4,927,447 | May 22, 1990 |
| Tanaka | 5,013,349 | May 7, 1991 |

The patent to Baldwin, et al. teaches the use of a supply tank 39 filled with agricultural chemicals in liquid form which is delivered to a calibration tank 30 by means of a transfer pump 38. When the tank 30 is full, valves 41 and 44 are shut off and a vent valve 45 is open to permit gravity flow from tank 30 into a line 31. A clutch 88, when engaged, powers a high pressure pump 15 from rear wheels 12 of a tractor, causing liquid to be drawn from the tank 30 through a check valve 32 and delivered under high pressure through a line 35. Line 35 conveys the liquid to a delivery valve 36 mounted on a frame 70. In this manner a series of liquid "slugs" are propelled at high pressure through an outlet 57 into the soil.

Similarly, the patent to Marron, et al. teaches the use of a soil treatment apparatus in which a vehicle is provided with a power unit 15, a shaft 16 driven by the power unit, a belt 24 which, through shaft 16, drives a second shaft 27 upon which a cam 30 is provided. The cam 30 actuates the fluid injecting mechanisms during each revolution of the shaft 27. More specifically, a plurality of injector units 32 are arranged side by side in a row and the cam 30 is provided with a spirally shaped rise to operate the injector units. A storage tank 34 delivers the liquid through a hose 35 and a filtering unit 36 and is fed to a distributing manifold 37 to the injector units. Notice a check valve including a housing 40, valve number 41 and valve spring 42 (FIG. 3) to permit the flow of liquid into the port 39 of injector unit 32 and to prevent back flow.

The patent to Koslow, et al. teaches the use of a soil conditioning composition which is to be mixed with soil. In general, a polymer is delivered into the soil as a method for retarding the loss of water from the water permeable soil. Initially the polymer contacts the soil thereby conditioning the soil. After irrigating the soil at periodic intervals as required, the water content of the soil is maintained. This patent does not teach the delivery system that is contemplated herein. The soil conditioning composition is applied to the soil merely as a water solution. The soil must necessarily be subsequently irrigated at periodic intervals to maintain the water content of the soil.

The instant invention is distinguishable over the prior art in that a polymeric solid additive is provided which is formulated to absorb water near the roots, making the water available to plants and lawns as needed, thereby allowing longer time intervals between watering. The instant invention pulses the polymer into the soil using a machine that can withstand the rigors of high pressure pulsing in an economical and reliable fashion.

The remaining citations, which show the state of the art diverge more starkly from the claimed nexus of applicants' invention.

SUMMARY OF THE INVENTION

The instant invention facilitates the introduction of a polymer below the surface level of soil by first mixing the polymer in water and by then injecting the polymer and water mixture through the soil. The invention works by taking advantage of the porosity of the soil without having to mechanically "spike" or reconfigure the exterior contour of the soil. In essence, a storage tank supported on a trailer receives a combination of polymer and water. A pump receives the mixture and delivers it through a high pressure hose to an outlet distribution device formed from a plurality of nozzles supported on a wheeled carriage frame. The mixture is injected into the soil by periodic pulsing of a solenoid type valve so that upon opening the valve, the mixture is injected under high pressure into the soil. When the valve is closed, a pressure bleed-off returns the mixture into the tank for agitating the mixture in the tank.

By having the device according to the instant invention deliver discreet quanta of polymer and water together, in effect a slug of material is fired into the ground at uniform, programmable distances. Depending upon the type of soil involved, the slug penetrates the top surface of the ground. Then, as it contacts a gradient of the soil or looses momentum, it fans out or has its trajectory distorted in some other way by its contact either with the soil or other materials such as rocks and pebbles. The placement of the slugs in a uniform manner within the soil minimizes the degree to which the ground will swell non-uniformly, especially when the slugs and their "splatter" pattern within the soil are sufficiently close together to provide a uniform effect in the soil.

The soil characteristics, if known, can be correlated with both the pressure at which the slugs are administered into the ground and the density distribution of the slugs, thereby controlling both the depth of penetration and topographical matrix pattern so that, within certain limits, the optimum depth and density can be maintained in the distribution of the polymer so that the roots are optimally fed.

One benefit in placing the polymer in the soil includes a substantial decrease in watering because the water stays closer to the target area for protracted periods of time. For example, experimentation has shown that golf courses which require irrigation every twenty-four hours in arid climates can merely irrigate one-third as frequently.

It is to be noted that when the plant life is to be fertilized and if the fertilization is in the form of a liquid, the hydrophylic polymer, will hold the nutrient close to the target zone. This minimizes nutrient run off which has heretofore seriously afflicted agricultural enterprises because it has an unwanted effect in creeks, streams and rivers, with sometimes deleterious effect on aquatic conditions downstream.

Where insecticides that are plant systemic are to be used, the liquid delivery of such an insecticide coupled with an injected polymer would have a similar benefit because the insecticide is held adjacent the targeted root zone thereby minimizing the degree of run off. Even when a non-systemic insecticide is used, a lighter application may only be necessary and the fear of run off will not be as great.

With respect to both fertilizers and insecticides, it should be clear that if accurate delivery of the substance occurs, excessive amounts of the fertilizer or insecticide need not be used. This also minimizes the extent to which the substance migrates away from its targeted zone of application, such as can be caused by foot traffic.

OBJECTS OF THE INVENTION

Accordingly, it is a primary object of the present invention to provide a new and useful polymer injecting apparatus and method therefore.

A further object of the present invention is to provide a device as characterized above which is relatively inexpensive to manufacture, benefits from mass production techniques, and is durable and safe to use.

A further object of the present invention is to provide a device as characterized above which more efficiently injects a polymer mixture into soil in a manner not possible by known prior art instrumentalities.

A further object of the present invention is to provide a device as characterized above constructed such that the structure is easily transported to and utilized in a variety of horticultural environments.

A further object of the present invention is to provide a device as characterized above which is capable of spraying and injecting orchards, trees and shrubs.

A further object of the present invention is to provide a device as characterized above which renders less frequent the need for watering, feeding and exterminating in various horticultural environments.

Viewed from one vantage point, it is an object of the present invention to provide a device for injecting discrete quantum of liquid into porous media, comprising, in combination:

a storage means within which the liquid resides, an outlet for distributing the liquid, means for delivering the liquid from said storage means to said outlet under pressure, valve means interposed between said delivery means and said outlet to interrupt migration of the liquid from said delivery means to said outlet, and bypass means interposed between said delivery means and said valve means and communicating with said storage means to return the liquid to said storage means upon closing of said valve means.

Viewed from a second vantage point, it is an object of the present invention to provide a method of shooting slugs of liquid into soil, the steps including:

delivering the liquid at pressure to an outlet, throttling the liquid adjacent the outlet to pulse the liquid, and relieving the pressure generated when the liquid delivery is interrupted by throttling the liquid.

Viewed from a third vantage point, it is an object of the present invention to provide a device for injecting hydrophylic polymer into soil to improve the ability of the soil to retain water, thereby minimizing the need for irrigation, comprising, in combination:

a trailer, a storage tank carried on said trailer, said tank including a water inlet and a polymer inlet, means for mixing water and polymer in said storage tank, an outlet, delivery means interposed between said storage tank and said outlet, a return means interposed between said delivery means and said outlet and communicating with said storage tank for diverting mixed polymer and water back to said storage tank, and valve means interposed between said return means and said outlet to allow the mixed water and polymer to pass either through said outlet or back to said return means.

These and other objects will be made manifest when considering the following detailed specification when taken in conjunction with the appended drawing figures.

BRIEF DESCRIPTION OF THE DRAWING FIGURES

FIG. 1 is a perspective view of one portion of the apparatus according to the present invention.

FIG. 2 is a perspective view of a second portion of the apparatus according to the present invention.

FIG. 5 is a side view taken along lines 5—5 of FIG. 6 showing the FIG. 2 portion with an ensconcing shroud removed for greater clarity.

FIG. 6 is a non-sectioned front view of that which is shown in FIG. 5.

FIG. 7 is a top plan view of that which is shown in FIGS. 5 and 6 with the shroud removed.

FIG. 8 is a schematic flow diagram explanatory of the cooperation of the various components defining the invention.

FIG. 12A is a top view of an optional enhancement used to unite the portions shown in FIG. 1 and FIG. 2.

FIG. 12B is a side view of that which is shown in FIG. 12A.

DESCRIPTION OF PREFERRED EMBODIMENTS

Figure 3:
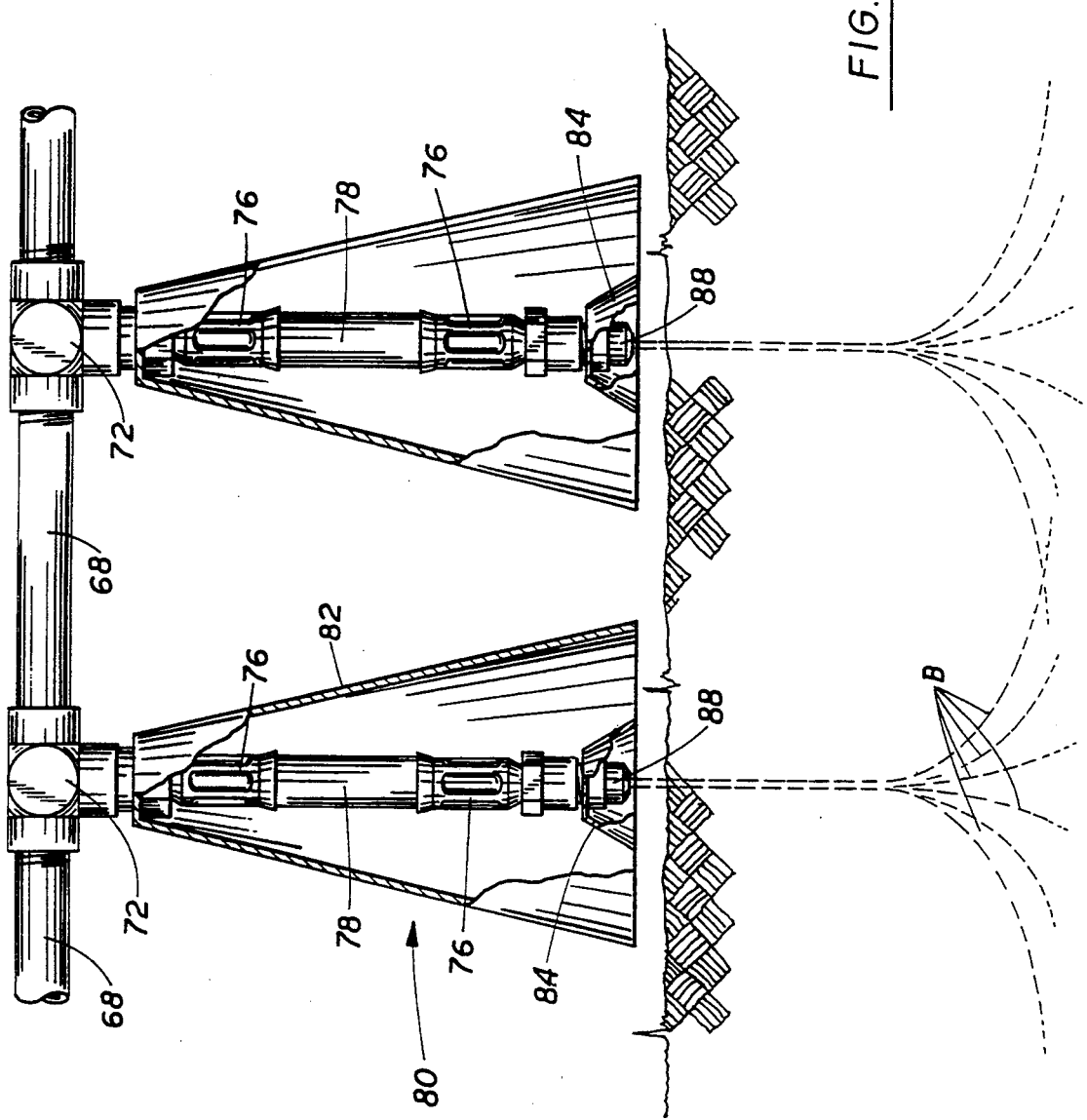
FIG. 3 is a detail associated with FIG. 2, partially fragmented to provide clarity.

Considering the drawings, wherein like reference numerals denote like parts throughout the various drawing figures, reference numeral 10 (FIG. 8) is directed to the injector device according to the present invention.

In its most elemental form, the injector device 10 includes two components: a trailer 100 upon which a storage tank 20 is provided within which the liquid to be injected is stored and an outlet 60 which actually dispenses the liquid at the desired site. A high pressure hose 44 allows fluid to be communicated from the tank 20 to the outlet 60 as will be explained, with various instrumentalities interposed between the tank 20 and the outlet 60 for the purposes of efficiently allowing the system to operate in an optimal manner.

Referring specifically to FIGS. 1, 4, 8, 9 and 10, the details with respect to the trailer 100 and the associated tank 20 can now be explored. The trailer 100 includes a platform 102 elevated above the ground by means of a pair of wheels 104 interconnected by means of an axle 106 so that the trailer 100 can move from one location to another. Fenders 108 over the wheels 104 protect an upper portion of the trailer from contamination kicked up by the wheels 104. A leading portion of the trailer 100 includes a tongue 110 and a trailer hitch 112 to facilitate towing. A support jack 111 is optionally coupled to a portion of the tongue 110 adjacent the hitch 112 to allow the trailer to remain level. Appropriate taillights 114 are provided on a rear portion of the trailer remote from the tongue 110.

A top surface of the trailer 100 supports the tank 20 by means of support pillows 116 which attach to a bottom of the tank by means of straps 120 and saddle members 118. In essence, the pillows 116 are fixed to a top surface of the platform 102 while the straps 120 are removably attachable to the saddle 118. The saddle is fixed to the pillow. In this manner, the straps 120 can removably secure the tank as should now be evident.

Figure 10:
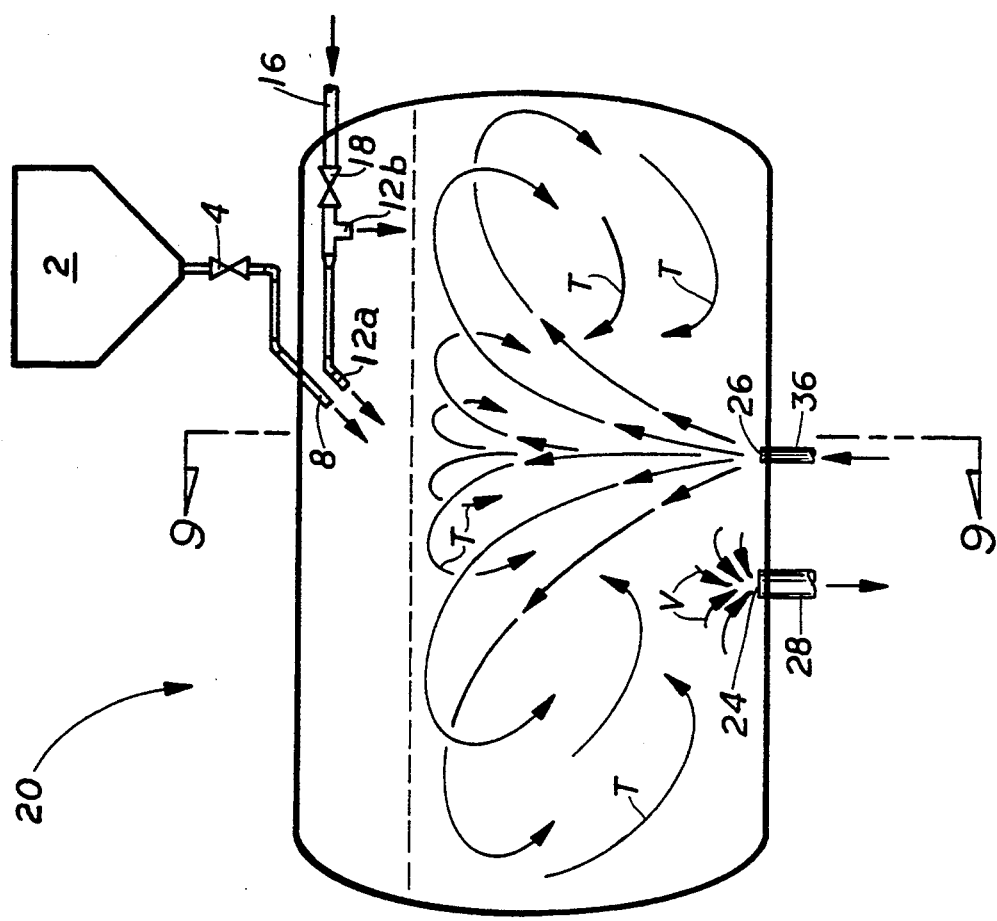
FIG. 10 is a sectional view nearly along the longitudinal axis taken along lines 10—10 of FIG. 9 providing similar circulatory information with respect to the storage tank which is a part of the invention.

The tank 20 includes an access lid 22 located on a topmost portion of the tank 20 which is formed by a boss extending up from the tank. The boss is fashioned for mating engagement with the access lid 22. Thus, the interior of the tank 20 can be accessed through lid 22. FIG. 10 reflects the provision of a drain 24 at a bottom of the tank and a return 26 for readmitting liquid to the bottom of the tank 20 in a manner to be defined.

An upper portion of the tank also includes a hopper 2 communicating with an interior of the tank 20 and providing a feed by which pulverulent material can be judiciously admixed into the tank 20. More particularly, the hopper 2 is supported atop the tank 20 by means of a pad 122 (FIG. 1) perched on an exterior of the tank 20 and overlying the strap 120. In one form of the invention, the pad 122 could be integrally formed with strap 120 and removable therewith. In any event, a plurality of legs 124 extend up from the pad 122 and support the hopper 2 in elevation so that the material can flow by means of gravity to within the tank. The hopper 2 is provided with a lid to prevent contamination of the material to be mixed. It is contemplated that the polymer will be loaded from this hopper into the tank 20.

FIGS. 8 and 10 reflect the existence of a valve 4 which regulates the feed of material from the hopper 2 into the interior of the tank 20. In one form of the invention, the valve 4 is controlled by an electric current produced through conductor 6 which receives a signal for the need of more polymer from a float valve 18 within the tank and to be described shortly. The material from the hopper 2 is sprayed into a central topmost portion of the tank by means of a nozzle 8.

While the nozzle 8 is dispensing polymer, it does so in response to a signal sent from a float valve 18 which monitors the level of liquid within the tank. Typically, it is preferred that the liquid remain below the nozzle 8 but near the top of tank 20. When the level should fall to an undesirably low state, the float portion of float valve 18 will drop to a lower position, enabling a switch which sends an electrical signal requiring the addition of further polymer. In addition, and at the same time, actuation of the float valve (creating a demand for more polymer) also opens a valve to allow more water to be admitted into the tank 20.

The tank 20 distributes water in two branches. A first branch 12a has a nozzle outlet substantially parallel to and at a lower horizontal elevation from the polymer nozzle 8. Thus, as the polymer exits the nozzle 8 as a fine spray it first contacts a mist of water exiting the first branch 12a of a waterline. A second branch 12b of the waterline dispenses water directly into the tank 20.

Water is received beyond the float valve 18 from a waterline 16 having a filter 14 interposed in line therewith to preclude the unwanted through passage of contaminants which may damage downstream equipment. The waterline 16 is in operative communication with a reel 126 (FIG. 1) supported on a top surface of the platform 102. The reel 126 has a pair of upwardly extending tangs 126a which supports a spool 128 having hose 16 thereon. In this manner, the trailer can be removed from a fixed waterline by a substantial distance, at least the length of the waterline 16 contained on the reel 126. A hand crank 130 is operatively coupled to the reel 126 and spool 128 to allow the waterline 16 to be retracted once it has been played out. Thus, a storage tank 20 is provided which receives filtered water from a remote area. The water and the polymer are mixed and held in the tank 20 for subsequent use.

Hydrostatic pressure of the liquid mixture in the tank 20 causes the liquid to be dispensed by gravity from the drain 24 and through a conduit 28 coupled to the drain which in turn communicates with a pump 30. The pump takes the relatively low-pressure, gravity-feed liquid coming through conduit 28 and discharges it at a relatively high pressure, typically in excess of 3000 psi, through pump outlet conduit 32.

In essence, the pump 30 (FIGS. 4 and 8) is energized by its operative coupling to an engine 40 through a pulley drive belt system. One pulley is disposed on the pump, and another on the engine. The pulleys are connected by means of the drive belt 36. The engine 40 is preferably gas powered and is initially energized by means of a battery 39 carried on a top surface of the platform 102. Fuel is fed to the engine 40 from a gas tank 41 similarly carried on a top surface of the platform 102. A gas line 43 extends between the gas tank 41 and the gas engine 40 providing gasoline.

The pump outlet conduit 32 is in operative communication with a bypass means 50 which functions as both an unloader and pressure regulator. In essence, the bypass means 50 throttles fluid between one of two passageways: a return conduit 34 ultimately providing diversion of the liquid back to the tank 20 and a high pressure conduit 44 which goes to the outlet means 60 to be described. The bypass means 50 includes a pressure gauge P1 denoting an internal pressure within the bypass to provide an indicator on the trailer of the status of the system in operation. The return conduit 34 is operatively coupled to a T-branch which diverts the liquid into one of two directions: either to a drain 42 via conduit 38 or to a return line 36 which feeds the liquid back into the tank 20 through the return opening 26 formed in the bottom of the tank 20.

Figure 9:
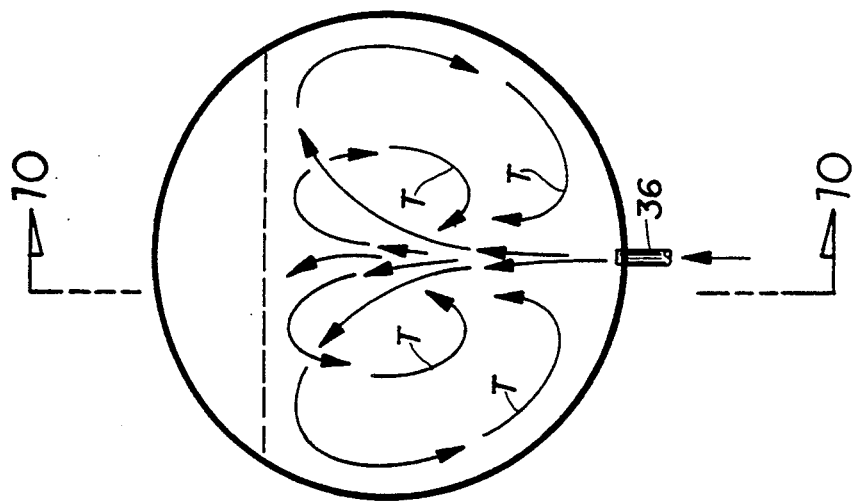
FIG. 9 is a sectional schematic view transverse to a longitudinal axis along lines 9—9 of FIG. 10 showing turbulence in a FIG. 1 mixing tank according to the present invention.

Note that FIGS. 9 and 10 reflect a circulation pattern caused by having the return line 36 and return opening 26 receiving liquid from the pressure regulator bypass means 50. As shown in FIGS. 9 and 10 extreme turbulence as suggested by the arrows T assure that little sedimentation if any occurs or that separation of the polymer from the water is negligible so that the substance stays mixed and agitated substantially during the entire time that the device 10 is in operation. By having the return opening 26 and the associated low pressure line 36 oriented slightly offset from the geometrical center of the tank bottom but along a center line with respect to the longitudinal axis of the tank 20, a bias is created resulting in greater turbulence to the right-hand side of FIG. 10 than the left-hand side. Notice however that the drain 24 and the drain conduit 28 is somewhat larger than the return 36. This provides a vortex V at the drain 24 to provide a swirl adjacent the drain for improved circulation in mixing on that (left-hand) side of the tank 20. The drain 24 is offset from a geometrical center of the tank substantially to the same extent as the return 26 and in the same vertical plane.

Figure 4:
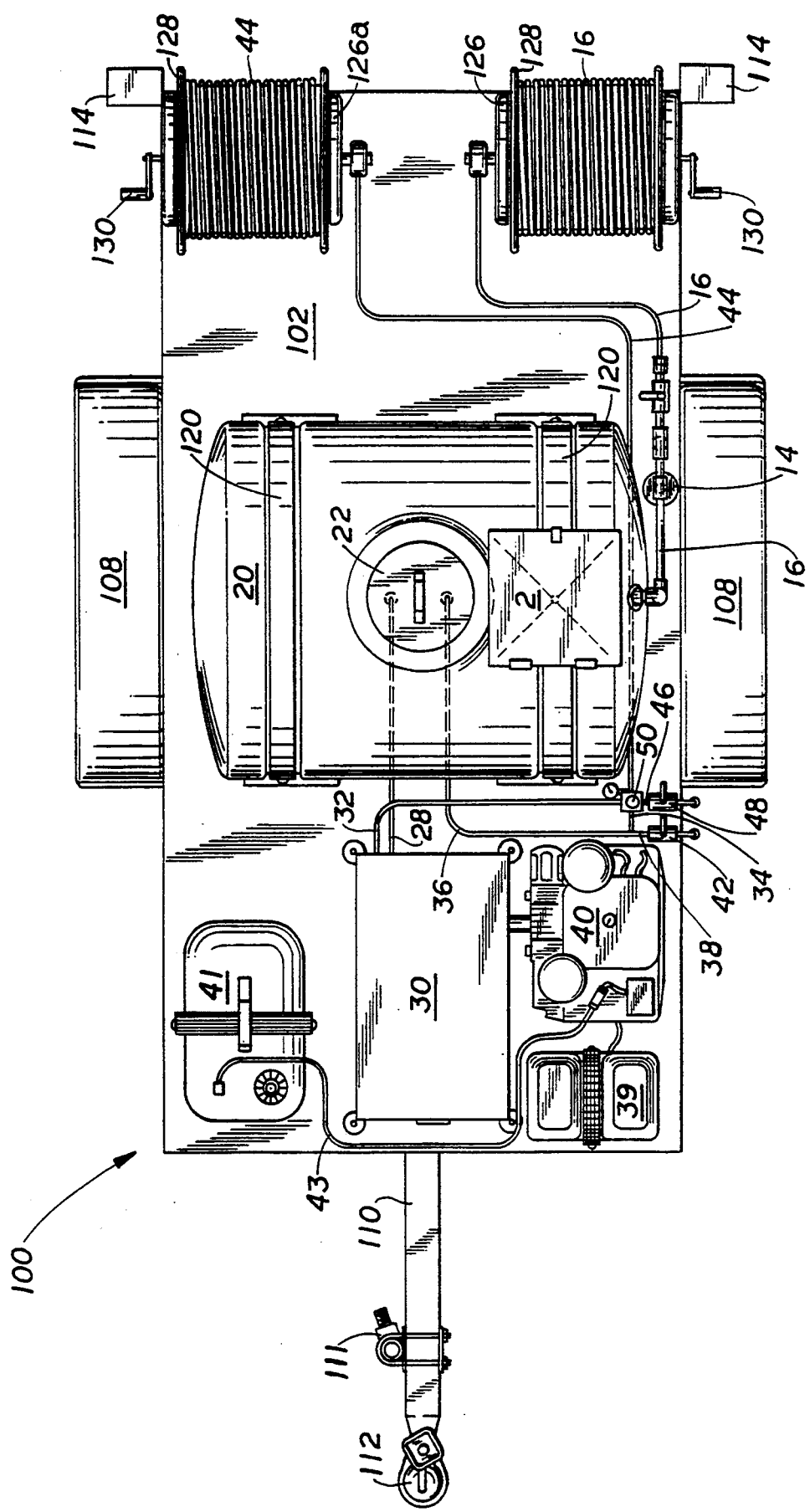
FIG. 4 is a top plan view of that which is shown in FIG. 1.

Liquid may also leave the bypass means 50 either via a high pressure line 44 or can be drained through a conduit 46 beyond a valve 48 which is tapped into the high pressure line 44 at a site immediately proximate the pressure regulator and its associated pressure gauge on the trailer. As shown in FIGS. 1 and 4, the high pressure hose 44 can be stored on a reel 126 (similar to hose 16). Reel 126 has upwardly extending tangs 126a which support a spool 128 upon which the high pressure line 44 can be stored and retracted by means of a hand crank 130 operatively connected to the spool 128. In this manner, the outlet 60 can be removed from the trailer 100 a considerable distance by playing out high pressure line 44 to the outlet 60 in a manner to be defined. Typically, the internal pressure of this high pressure line is in the order of 3000 psi.

Attention is now directed to FIGS. 2 and 5 through 8. Details with respect to one form of outlet 60 are reflected therein. The high pressure liquid in line 44 is operatively coupled to the outlet 60 by means of a coupling 52 carried on a carriage which includes a wheeled frame 90. The frame also supports the dispensers 80 for distributing the liquid pumped from the tank 20. In essence, the coupling 52 communicates liquid in line 44 to a solenoid valve inlet conduit 54 and thence to a solenoid valve 56. The area immediately adjacent to solenoid valve 56 includes another pressure gauge P1 so that the person remote from the trailer and operating the outlet 60 can be aware of the line pressure at all times. The solenoid valve 56 in turn communicates with a solenoid valve outlet conduit 58 and thence to a T-passageway 62 which branches the flow from the solenoid into a first branch 64a and a second branch 64b.

The solenoid valve 56 is powered by its operative coupling to a battery 39 supported on the wheeled frame 90. The solenoid valve 56 has an open duration and closed duration which is adjustable by virtue of its operative coupling to a time-delay relay 86. In essence, the battery 39 provides power to the relay 86 which controls the solenoid valve as shown in FIG. 8. The relay has two variables which control the solenoid valve: the duration of time when the solenoid valve 56 remains open which allows liquid to pass therebeyond and the duration of time when the solenoid valve 56 remains closed which diverts the liquid from the outlet 60 and redirects the liquid back into the tank 20 by means of the bypass 50 as explained hereinabove.

An important feature of the present invention involves the ability to control the solenoid in both phases of its operation i.e. the length of time that valve 56 remains closed and the length of time that valve 56 remains open. For example, the length of time that the solenoid valve remains closed (thereby bypassing the outlet) may be modified as a function of the speed at which the wheeled frame 90 moves along the surface that is to be treated. Typically, the duration for which the solenoid remains open thereby dispensing a quantum of fluid therebeyond may relate to the magnitude of the liquid dispensed during each injection pulse. Thus, fine tuning in the distribution pattern can be obtained for different types of ground porosity. A slow travel speed by the wheeled frame over the terrain coupled with a short burst of fluid beyond the solenoid valve into the ground has the effect of providing a multiplicity of small "charges" densely distributed over the terrain. At the other extreme, a large quantum can be distributed in a sparse pattern if so desired. Obviously permutations of these two extremes are also readily evident in view of the forgoing.

Note the presence of manual control 57 (FIGS. 5 through 8). This allows the relay 86 to be overridden. Control 57 can be conveniently carried on the frame near a hand grasping area 101.

The two branches 64a and 64b each communicate with a manifold 66 and boom at a forward portion of the wheeled frame 90. Thus, assuming the wheeled frame 90 were traveling in the direction of the arrow A shown in FIG. 7, the boom would be transverse thereto.

More particularly, the manifold 60 interlinks a multiplicity of straight sections of pipe 68 which in turn connect to a series of tees 72 so that the boom can extend transverse to the direction of travel for a distance which is only limited by the structural rigidity of the straight sections 68, the tees, and interposed couplings 70 which unite sections of pipe 68 and tees 72. The couplings 70 provide quick disconnect to alter the swath that the boom encompasses on a single pass. It should be evident that the wider the width of the boom, the greater the pressure may need to be when it is delivered along the high pressure line 44. The boom links together a series of lineal pipe sections 68 through tees 72. At lateral-most extremities of the boom, elbows 74 seal off an interior boom passageway. The tees 72 and elbows 74 in turn support downwardly extending dispensers 80 which provide the final constraint on the fluid prior to its admission into the underlying substrate or terrain.

FIG. 3 reflects structural details of the dispenser 80 as it may appear and explains the manner in which liquid from the dispensers 80 contacts the earth over which frame 90 passes. As shown, each dispenser 80 includes an upper section 76 preferably formed from rigid material and a similar lower section 76 spaced from the upper rigid section by means of an intermediate flexible portion 78. A lowermost extremity of the rigid section 76 away from the tee 72 terminates in a deflector cup 84. Cup 84 opens downwardly and diverging towards the ground. Cup 84 is a truncated cone having a hollow interior. Note that liquid escaping from a nozzle 88 at a lowermost terminus of lower section 76 departs from the dispenser 80 in a substantially needle-like stream. That is, the nozzle 88 allows the fluid to be dispensed therefrom as a very thin elongate cylindrical stream of liquid.

In certain instances, the boom and the wheeled carriage frame 90 may pass over uneven terrain or contact obstacles such as rocks or other forms of debris. When this occurs, these obstructions may cause deflection of either the dispenser 80 or the stream. The intermediate flexible section 78 is intended to counteract the tendency of the nozzles 88 to become damaged or pass trauma to the connections on the boom when nozzles 88 receive shock loads from having encountered an immovable obstacle. By having the intermediate flexible section 78 yield in the face of an unyielding object, the reliability of the outlet 60 will have been extended. When high pressure streams are emitted from the nozzle 88, it may be desirable to circumscribe the dispenser 80 with another downwardly extending cup which is fixed from the lowermost portion of the tee 72 as it connects with the rigid section 76. Thus, another downwardly open facing, outwardly diverging cone 82, somewhat similar in configuration to the deflector cup 84 extends from the tee 72. Cone 82 provides another control over the unwanted dissemination of liquid therebeyond. This cone 82 is isolated from the flexible section 76, and it can be made from resilient material characterized in its ability to have a sufficient memory to return to an original, unstressed state after contact with an immovable object.

An alternative or supplement to the cone 82 or cup 84 which are shown in FIG. 3 may be the flexible curtain-type shroud 92 overlying the boom and shown in FIG. 2. In essence, the curtain-shroud 92 is a container having an open bottom. The sides and top of the curtain-shroud 92 overlie the boom so that errant liquid leaving the dispenser 88 will not migrate in an unwanted manner. An additional degree of protection may be afforded by another blanket 94 extending over a topmost portion of the frame to be described hereinafter.

The wheel and frame assembly 90 may be most easily understood perhaps from viewing FIG. 5. It includes a front pair of wheels 96 and a rear pair of wheels 96 carried on a rectangular frame 98. Frame 98 includes a hand grip area 99 whose angle of attack is adjustable by means of an adjustment lock 97 coacting against a slot in gusset 97a. A hand grasping area 101 is also provided. Hand grasping area is near the manual control 57 mentioned above.

In sum, cup 84 can accommodate some reflected liquid from dispenser 88. Cone 82 does not bend with flexible section 78 and can protect from additional splatter. Cone 82 may be flexible. Curtain-shroud 92 and blanket 94 can protect from similar unwanted liquid migration. One, two, or all three devices may be used at once.

Deferring back to FIG. 3, with the device as thus far described, an intense needle of liquid contacts and penetrates the earth substantially unaffected by its initial contact with the soil, depending of course upon the consistency of the soil over which this device 10 is being passed. In extremely sandy soil, penetration of the liquid can be approximately as much as eight inches under 3000 psi pressure before the liquid slows down sufficiently that it tends to splatter, i.e. fan out as shown by the direction of the diverging migratory pattern reflected by reference arrows B of FIG. 3. Where the soil has an extremely dense quality such as a high clay composition, the fanning out phenomena may occur only two inches below the soil surface. By taking representative soil core samples, the delivery pressure of the liquid can be moderated by operative manipulation of a valve on the bypass 50 within certain limits to control the depth at which the device will deliver material. In addition, the length of the boom will directly affect pressure at which the liquid is dispensed.

Certain variations can now be explored. Attention is first directed to FIGS. 12A and 12B which shows a scenario in which the wheeled frame 90 is operatively coupled to a trailing portion of the trailer 100. As shown, the platform 102 has a rearwardmost edge substantially C-shaped in section at 132. A topmost portion supports a rearwardly and downwardly declinated support bracket 134. A top portion of C-shaped section 132 has a hole allowing fastening of the bracket 134 by means of a bolt 136. A distal extremity of the bracket 134 supports a tube 138. The handle 101 of wheeled frame 90 has an exterior dimension complemental to the interior bore of the cylindrical sleeve 138. It is contemplated that two such cylindrical sleeves 138 will be provided to support both handles 101 whereby the wheeled frame 90 can be trailered behind trailer 100. Thus, the entire device 10 can proceed as an integral unit. It should be clear that the boom described hereinabove could also have been directly mounted to a trailing portion of the trailer 100.

Note the wheels 96 can be raised or lowered with respect to frame 90 to provide ground clearance. Lever 96a coacts with an eccentric 96b to releasably adjust the wheels.

Figure 11:
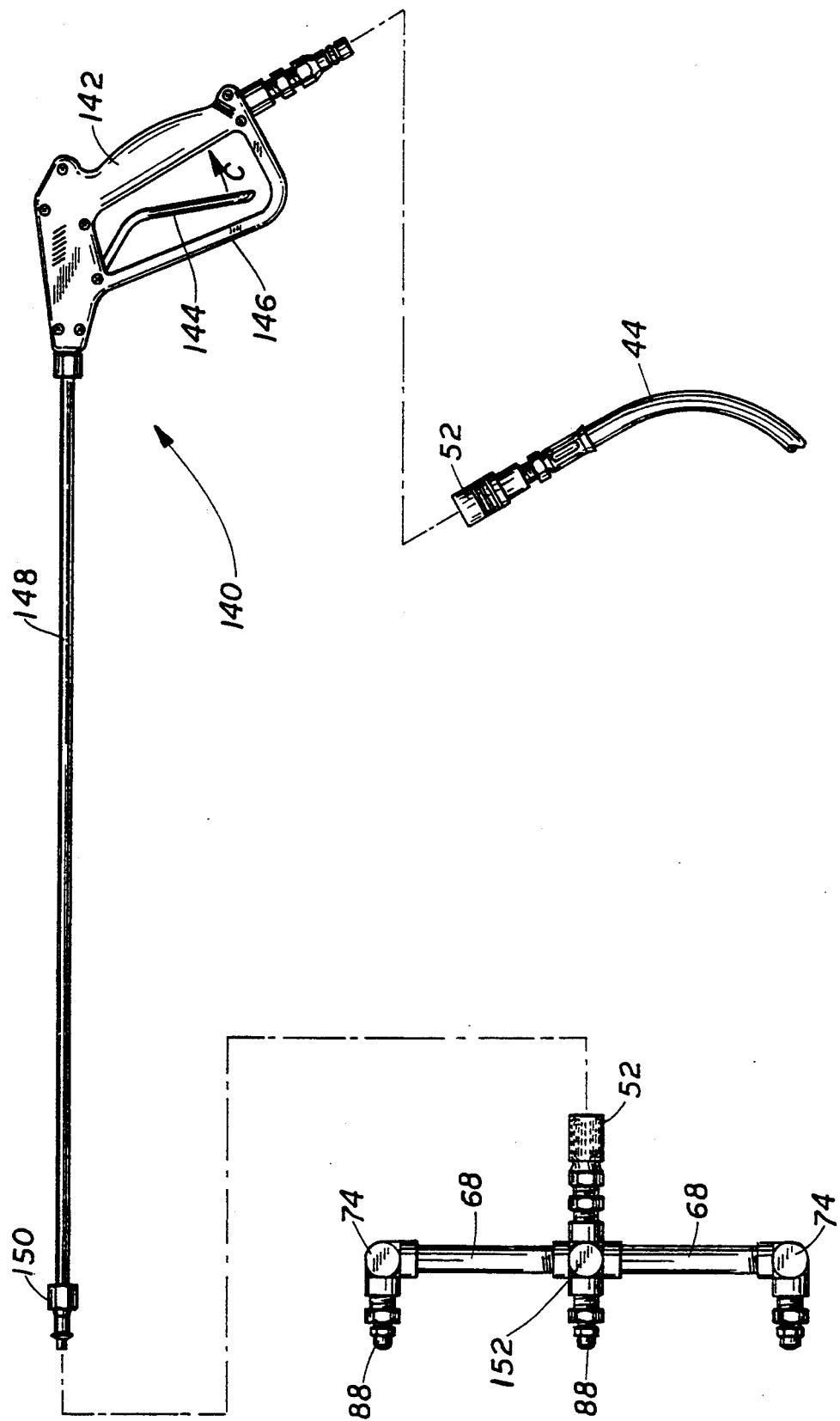
FIG. 11 is a side view of an alternative to that which is shown in FIG. 2.
Figure 13:
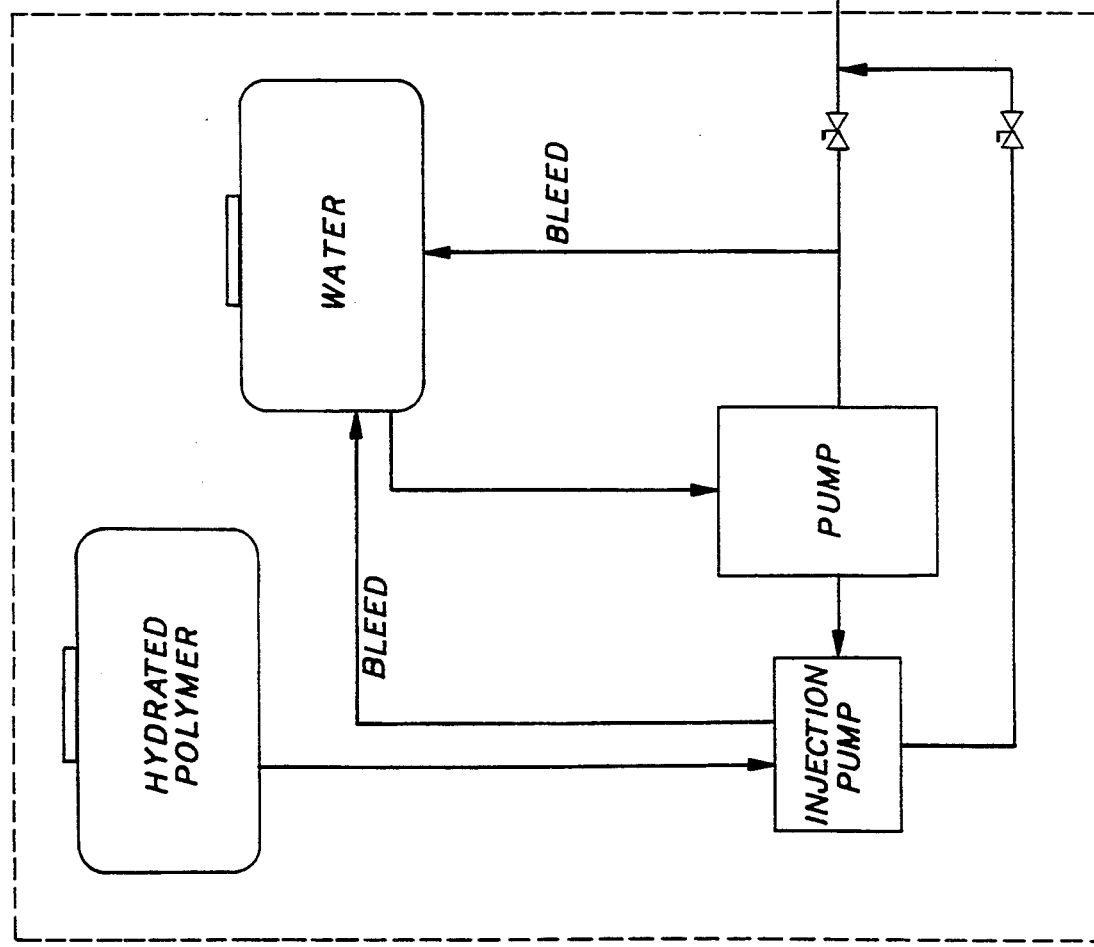
FIG. 13 is prior art in schematic form.

In some instances, the wheeled frame 90 does not provide sufficient compactness to enter extremely cramped corridors. In other situations, a multiplicity of dispensers 80 are not required. FIG. 11 reflects such a scenario. As shown in FIG. 11, a hand manipulated wand 140 is in operative communication with the high pressure line 44 by means of a coupling 52 described hereinabove. The wand 140 includes a hand grip area 142, a trigger 144 and a trigger guard 146. Operation of the trigger in the direction of the arrow "C" opens a valve (not shown) allowing liquid within the high pressure conduit 44 to pass beyond the valve to a rigid wand 148. A terminal portion 150 of the rigid wand dispenses the liquid therefrom. Examples of where the wand 140 is desirable would be around trees or shrubs. In some instances, however, the outlet 150 can couple to a manifold via another quick disconnect coupling 52 and hence downwardly to a fourway passage 152 which communicates at lateral extremities with a rigid rod 68 extending horizontally therefrom and a downwardly extending dispenser 88. The rigid section 68 communicates with elbows 74 and then to other dispensers 88 as shown in FIG. 11.

Moreover, having thus described the invention, it should be apparent that numerous structural modifications and adaptations may be resorted to without departing from the scope and fair meaning of the instant application as set forth hereinabove and as described hereinbelow by the claims.

I claim:

1. A device for injecting a discrete quantum of liquid into porous media, comprising, in combination:
    a storage means within which the liquid resides,
    an outlet for distributing the liquid, the outlet located on a frame separate from said storage means and including means for independently locating the outlet with respect to said storage means,
    means for delivering the liquid from said storage means to said outlet under pressure,
    valve means interposed between said delivery means and said outlet to interrupt migration of the liquid from said delivery means to said outlet,
    and bypass means interposed between said delivery means and said valve means and communicating with said storage means to return the liquid to said storage means upon closing of said valve means;
    said bypass means including a turbulence generating means generating turbulence at a return opening at said storage means, said turbulence generating means inhibiting sedimentation of dissolved solids suspended within the liquid.

2. The device of claim 1 wherein said return opening is oriented on a bottom of said storage means, said delivering means including a drain in said storage means in fluid communication with said outlet, said return opening spaced from a geometric center of said bottom of said storage means and said drain located on a bottom of said storage means spaced from a geometric center of said bottom of said storage means.

3. The device of claim 1 including a trailer wherein said trailer includes at least one hose reel supporting a hose for fluid exchange with said device.

4. A method of shooting slugs of liquid into soil, the steps including:
    delivering the liquid at pressure to an outlet,
    throttling the liquid adjacent the outlet to pulse the liquid,
    relieving the pressure generated when the liquid delivery is interrupted by throttling the liquid, and mixing the liquid at entry into a storage tank from two components including a polymer and water, the water supplied by a waterline accessing an interior of the storage tank, the waterline including flow dividing means causing water passing through the waterline to be divided into a first branch and a second branch, the first branch outputting water adjacent and parallel to an orientation of dry polymer exiting a nozzle within the storage tank for mixing before striking a surface of liquid within the storage tank, the second branch passing into the storage tank without contacting the dry polymer, pumping the liquid from the storage tank, and continuing to mix the liquid after entry into the storage tank with a turbulence generating means by directing a portion of liquid exiting the storage tank back into the storage tank at an elevated pressure.

5. The method of claim 4 further including mixing the polymer and the liquid in its admission to the storage tank by spraying the polymer in the storage tank and contacting the sprayed polymer with water prior to contact with a body of liquid within the storage tank.

6. The method of claim 5 including recirculating a portion of the liquid back into the storage tank when the liquid delivery is interrupted by throttling the liquid when the throttling occurs by recycling the liquid back into the storage tank at a lowermost elevation and providing turbulence and further circulation within the storage tank.

7. The method of claim 6 including relieving the pressure generated from the liquid by having a single outlet from which the liquid emanates.

8. The method of claim 6 in which the throttling occurs by relieving the pressure through a multiplicity of outlets and by controlling a duration for which the throttling is both on and off.

9. The method of claim 6 including dispensing the liquid from a moveable frame and altering the elevation of the frame with respect to the terrain over which the frame rides.

10. A device for injecting hydrophillic polymer into soil to improve the ability of the soil to retain water, thereby minimizing the need for irrigation, comprising, in combination:

a trailer, a storage tank carried on said trailer, said tank including a water inlet and a polymer inlet, means for mixing water and polymer in said storage tank, said mixing means including a waterline accessing an interior of said storage tank, said waterline including flow dividing means causing water passing through said waterline to be divided into a first branch and a second branch, said first branch outputting water adjacent and parallel to an orientation of dry polymer exiting a nozzle within said storage tank for mixing before striking a surface of liquid within said storage tank, said second branch passing into said storage tank without contacting the dry polymer, an outlet, delivery means interposed between said storage tank and said outlet, a return means interposed between said delivery means and said outlet and communicating with said storage tank for diverting mixed polymer and water back to said storage tank, said return means including a turbulence generating means generating turbulence at a return opening at said storage tank, said turbulence generating means inhibiting separation of the polymer from the water, and valve means interposed between said return means and said outlet to allow the mixed water and polymer to pass either through said outlet or back to said return means.

11. The device of claim 10 wherein said storage tank includes a water inlet for receiving water therewithin, a hopper disposed on a top surface of said storage tank within which pulverulent material is adapted to reside, and means operatively connecting said water inlet and said hopper such that both operate in concert to distribute into said storage tank concommitantly upon need for additional material within said storage tank, and wherein said turbulence generating means includes said return inlet located near a bottom of said storage tank, such that any of the polymer which has separated is prevented from settling at said bottom.

12. The device of claim 11 wherein said storage tank includes a valve operatively coupled to said hopper and a valve operatively coupled to said water inlet said valves operating both said hopper and said water inlet in concert, and a nozzle means extending from said hopper to an interior of said storage tank oriented to dispense material from the hopper in an upper portion of said storage tank, and a first branch from said water inlet oriented to impinge upon output from said nozzle means to contact the output from said nozzle means and mix therewith, and a second branch oriented to direct water directly into said tank.

13. The device of claim 10 wherein said storage tank includes a drain at a lowermost portion thereof and said return opening adjacent to said drain, said drain communicating with a pump which includes said delivery means for delivering the liquid to said outlet under high pressure and said return means communicates with said return opening, said turbulence generating means including said return means directing liquid through said return opening at sufficient pressure to generate turbulence within said tank.

14. The device of claim 13 wherein said outlet includes a wheeled frame, a solenoid valve carried on said wheeled frame and operatively coupled to said liquid exiting said pump under high pressure, said solenoid valve including means for throttling the interval for which said solenoid valve remains closed and said solenoid valve remains open, and manifold means communicating with said solenoid valve and thereafter with a boom having dispensing means for distributing liquid therefrom.

15. The device of claim 14 wherein said dispensing means includes a flexible section allowing play should said dispensing means contact immovable objects, and means to control the direction of liquid dispensed from said dispensing means should said dispensing means become diverted at said flexible section.

16. A device for injecting hydrophillic polymer into soil to improve the ability of the soil to retain water, thereby minimizing the need for irrigation, comprising, in combination:

a trailer, a storage tank carried on said trailer, said tank including a water inlet and a polymer inlet, means for mixing water and polymer in said storage tank, an outlet, delivery means interposed between said storage tank and said outlet, a return means interposed between said delivery means and said outlet means and communicating with said storage tank for diverting mixed polymer and water back to said storage tank, and valve means interposed between said return means and said outlet to allow the mixed water and polymer to pass either through said outlet or back to said return means, wherein said storage tank includes a water inlet for receiving water therewithin, a hopper disposed on a top surface of said storage tank within which pulverulent material is adapted to reside, and means operatively connecting said water inlet and said hopper such that both operate in concert to distribute into said storage tank concommitantly upon need for additional material within said storage tank, wherein said storage tank includes a valve operatively coupled to said hopper and a valve operatively coupled to said water inlet said valves operating both said hopper and said water inlet in concert, and a nozzle means extending from said hopper to an interior of said storage tank oriented to dispense material from the hopper in an upper portion of said storage tank, and a first branch from said water inlet oriented to impinge upon output from said nozzle means to contact the output from said nozzle means and mix therewith, wherein said storage tank includes a drain at a lowermost portion thereof and said return inlet adjacent to said drain, said drain communicating with a pump which includes said means for delivering the liquid to said outlet under high pressure and said return means communicates with said return inlet, wherein said outlet includes a wheeled frame, a solenoid valve carried on said wheeled frame and operatively coupled to said liquid exiting said pump under high pressure, said solenoid valve including means for throttling the interval for which said solenoid valve remains closed and said solenoid valve remains open, and manifold means communicating with said solenoid valve and thereafter with a boom having dispensing means for distributing liquid therefrom, wherein said dispensing means includes a flexible section allowing play should said dispensing means contact immovable objects, and means to control the direction of liquid dispensed from said dispensing means should said dispensing means become diverted at said flexible means, and wherein said trailer includes a support platform elevated above terrain by means of a pair of wheels, a trailer tongue extending from one end of said trailer provided with a trailer hitch, said trailer further including first and second hose reels carried thereon, said first hose reel supporting a hose for feeding water to said storage tank, said second hose reel supporting a hose for liquid exiting said pump and adapted to be operatively coupled to said outlet.

17. A device for injecting a discrete quantum of liquid into porous media, comprising, in combination:

a storage means within which the liquid resides, an outlet for distributing the liquid, the outlet located on a frame separate from said storage means and including means for independently locating the outlet with respect to said storage means, means for delivering the liquid from said storage means to said outlet under pressure, valve means interposed between said delivery means and said outlet to interrupt migration of the liquid from said delivery means to said outlet, and bypass means interposed between said delivery means and said valve means and communicating with said storage means to return the liquid to said storage means upon closing of said valve means, said bypass means including a turbulence generating means generating turbulence at a return opening at said storage means, said turbulence generating means inhibiting sedimentation of dissolved solids suspended within the liquid, wherein said trailer includes a support platform elevated above terrain by means of a pair of wheels, a trailer tongue extending from one end of said trailer provided with a trailer hitch, said trailer further including first and second hose reels carried thereon, said first hose reel supporting a hose for feeding water to said storage means, said second hose reel supporting a hose for liquid exiting said delivery means and adapted to be operatively coupled to said outlet.

18. The device of claim 17 wherein said storage means includes a water inlet for receiving water therewithin, a hopper disposed on a top surface of said storage means within which pulverulent material is adapted to reside, and means operatively connecting said water inlet and said hopper such that both operate in concert to distribute into said storage means concommitantly upon need for additional material within said storage means.

19. The device of claim 18 wherein said storage means includes a valve operatively coupled to said hopper and a valve operatively coupled to said water inlet said valves operating said hopper and said water inlet in concert, and a nozzle means extending from said hopper to an interior of said storage tank oriented to dispense material from the hopper in an upper portion of said storage means, and a branch from said water inlet oriented to impinge upon output from said nozzle means to contact the output from said nozzle means and mix therewith.

20. The device of claim 19 wherein said storage means includes a drain at a lowermost portion thereof and a return inlet adjacent to said drain, said drain communicating with a pump which includes said means for delivering the liquid to said outlet under high pressure and said bypass means communicates with said return inlet, said delivery means including means to extend in length to reach said outlet on said frame when said frame is distant from said storage means.

21. The device of claim 20 wherein said frame includes wheels, a solenoid valve carried on said wheeled frame and operatively coupled to said liquid exiting said pump under high pressure, said solenoid valve including means for throttling the interval for which said solenoid valve remains closed and said solenoid valve remains open, and manifold means communicating with said solenoid valve and thereafter with a boom having dispensing means for distributing liquid therefrom, the wheeled frame further including a hand grasping area.

22. The device of claim 21 wherein said dispensing means includes a flexible section allowing play should said dispensing means contact immovable objects, yet maintains a high pressure spray at said outlet, and means to control the direction of liquid dispensed from said dispensing means should said dispensing means become diverted at said flexible means.

23. The device of claim 22 wherein said storage means is located on a trailer, said trailer including means for connecting said frame to said trailer, whereby said frame is utilizable without a person using the hand grasping area.

24. The device of claim 23 wherein said frame includes four wheels and said hand grasping area first extends upwardly diagonally away from said frame, then horizontally along a horizontal portion, then diagonally downward back to said frame, said horizontal portion both attachable to said connecting means of said trailer and graspable to direct said frame and said outlet independently of said trailer.

* * * * *